United States Patent
Zhan et al.

(10) Patent No.: US 8,522,536 B2
(45) Date of Patent: Sep. 3, 2013

(54) EXHAUST AFTERTREATMENT SYSTEMS FOR GASOLINE AND ALTERNATIVE-FUELED ENGINES, WITH REDUCTION OF HC, CO, NOX, AND PM

(75) Inventors: Rijing Zhan, San Antonio, TX (US); Phillip A. Weber, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 401 days.

(21) Appl. No.: 12/470,156

(22) Filed: May 21, 2009

(65) Prior Publication Data

US 2010/0293929 A1 Nov. 25, 2010

(51) Int. Cl.
*F01N 3/00* (2006.01)

(52) U.S. Cl.
USPC .............................. 60/301; 60/299; 60/311

(58) Field of Classification Search
USPC ........................................ 60/299, 301, 311
See application file for complete search history.

(56) References Cited

U.S. PATENT DOCUMENTS

| | | | |
|---|---|---|---|
| 5,396,764 A | 3/1995 | Rao et al. | |
| 5,519,993 A | 5/1996 | Rao et al. | |
| 5,855,854 A * | 1/1999 | Shinzawa et al. | 422/177 |
| 5,946,906 A * | 9/1999 | Akazaki et al. | 60/278 |
| 6,089,211 A | 7/2000 | Wenger | |
| 6,167,696 B1 * | 1/2001 | Maaseidvaag et al. | 60/274 |
| 6,497,851 B1 | 12/2002 | Hu et al. | |
| 6,681,566 B2 | 1/2004 | Itoh et al. | |
| 6,935,105 B1 | 8/2005 | Page et al. | |
| 7,119,044 B2 | 10/2006 | Wei et al. | |
| 2002/0162325 A1 * | 11/2002 | Kato et al. | 60/297 |
| 2003/0101718 A1 * | 6/2003 | Pfeifer et al. | 60/299 |
| 2003/0113242 A1 * | 6/2003 | Hepburn et al. | 422/180 |
| 2004/0175315 A1 | 9/2004 | Brisley et al. | |
| 2005/0069476 A1 * | 3/2005 | Blakeman et al. | 423/239.1 |
| 2005/0072141 A1 * | 4/2005 | Kitahara | 60/297 |
| 2005/0241296 A1 * | 11/2005 | McCabe et al. | 60/274 |
| 2006/0242947 A1 * | 11/2006 | Kay et al. | 60/284 |
| 2007/0137187 A1 * | 6/2007 | Kumar | 60/299 |
| 2007/0214777 A1 * | 9/2007 | Allansson et al. | 60/299 |
| 2008/0141664 A1 * | 6/2008 | Bidner et al. | 60/320 |

* cited by examiner

*Primary Examiner* — Thomas Denion
*Assistant Examiner* — Patrick Maines
(74) *Attorney, Agent, or Firm* — Chowdhury & Georgakis, P.C.; Ann C. Livingston

(57) ABSTRACT

An exhaust gas emissions aftertreatment system for spark-ignition engines, which simultaneously reduces the particulate matter, HC, CO, and NOx content of the exhaust. Various embodiments of the system have both a closely-coupled TWC device, and an under-floor treatment device. The under-floor device has either TWC or NOx reduction functionality, depending on whether the engine is run under stiochiometric or lean burn operating conditions.

8 Claims, 5 Drawing Sheets

EXHAUST AFTERTREATMENT SYSTEMS FOR GASOLINE AND ALTERNATIVE-FUELED ENGINES, WITH REDUCTION OF HC, CO, NOX, AND PM

TECHNICAL FIELD OF THE INVENTION

This invention relates to reducing harmful exhaust emissions from gasoline and alternative-fueled engines, and more particularly to exhaust aftertreatment systems for such engines that address particulate emissions in addition to gaseous emissions.

BACKGROUND OF THE INVENTION

Internal combustion engines used for both mobile and stationary applications are subject to strict emission limits. Approaches to reducing emissions include improved in-cylinder combustion designs or fuel modifications, but these improvements have fallen short of meeting emissions limits. Other approaches involve the use of exhaust aftertreatment devices, which have achieved significant emissions reductions.

For diesel engines, particulate matter (PM) emissions are regulated in the United States and other developed nations. However, for spark-ignited engines, currently there are no regulations that address PM emissions. Spark-ignited engines may be either gasoline or alternative fueled engines, the latter including engines fueled by compressed natural gas (CNG), liquefied natural gas (LNG), liquefied petroleum gas (LPG), ethanol, methanol, gas-to-liquid fuel, and coal-to-liquid fuel, and others.

PM emissions may be composed of black smoke (soot), sulfates generated by sulfur in fuel, and components of unburned fuel and oil. Although the mass of PM emissions emitted from spark-ignited engines is relatively low as compared to diesel engines, the mean diameter of the PM is significantly smaller. It is generally believed that smaller diameter PM is more harmful to health as it can penetrate more deeply into the lungs. Therefore, the control of PM emissions from spark-ignited engines is important, in addition to the existing control of hydrocarbon (HC), carbon monoxide (CO), and oxide of nitrogen (NOx) emissions.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to emissions aftertreatment systems for use in the exhaust system of a spark-ignited engine. Examples of spark-ignited engines other than gasoline engines are alternative-fueled engines, such as engines fueled by compressed natural gas (CNG), liquefied natural gas (LNG), liquefied petroleum gas (LPG), ethanol, methanol, gas-to-liquid fuel, and coal-to-liquid fuel, and others.

Typical applications of the exhaust aftertreatment systems described herein are with vehicles, such as automobiles, which have an engine compartment, a driver/passenger compartment with a floor above the axles and wheels, and an under-floor tailpipe. The aftertreatment systems described herein simultaneously reduce emissions of hydrocarbon (HC), carbon monoxide (CO), oxides of nitrogen (NOx) and particulate matter (PM).

Figure 1:
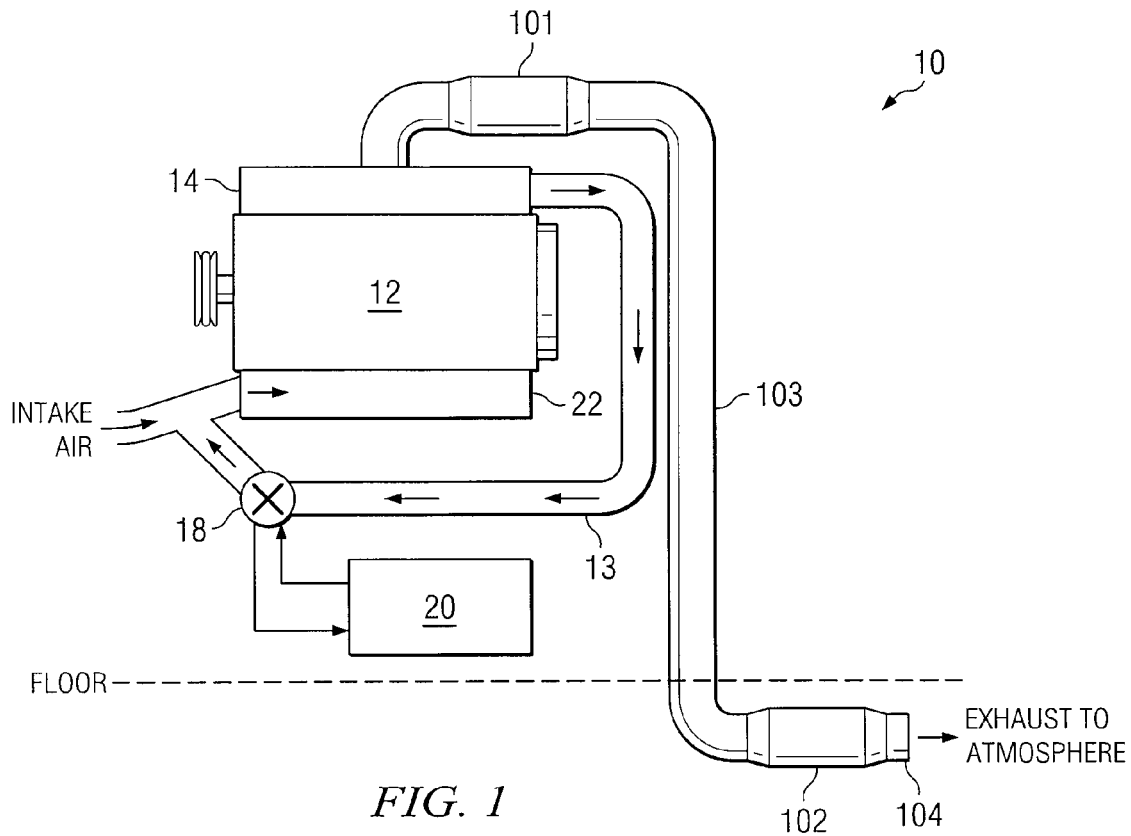
FIG. 1 illustrates a spark-ignited engine having an exhaust aftertreatment system that includes both close-coupled and under-floor emissions treatment devices.

FIG. 1 illustrates a spark-ignited engine system, generally identified as 10, having a "close-coupled" emissions treatment device 101 and an "under-floor" emissions treatment device 102. As indicated by the dotted lines, system 10 has an engine compartment containing the engine and related subsystems and devices, including the close-coupled emissions treatment device 101. A vehicle floor, separates the engine compartment and driver/passenger compartment (not shown) from the sub-floor subsystems and devices, including the under-floor emissions treatment device 102.

Close-coupled emissions treatment device 101 is located near the exhaust output of the exhaust manifold 14. An intermediate exhaust pipe 103 carries the exhaust from device 101, and travels under the floor of the vehicle, generally running parallel to the floor.

Under-floor emissions treatment device 102 is located downstream of the EGR loop and under the vehicle's floor. The treated exhaust exits the treatment device 102 into the atmosphere.

As explained below, various embodiments of the invention are designed for different engine operating conditions. However, each system is characterized by having both a close-coupled aftertreatment device 101 that provides TWC (three way catalyst) functionality, as well as an under-floor treatment device 102, which may have either TWC or NOx treatment functionality.

In the illustrative embodiment, system 10 also has an exhaust gas recirculation (EGR) loop 13, which is not required for purposes of the present invention, but is included for a more complete understanding of the example engine. The direction of flow of exhaust gas through the EGR loop is indicated by directional arrows in FIG. 1. A portion of the total exhaust gas discharged from the engine's exhaust manifold 14 is directed through the EGR loop, which may include a filter and/or heat exchanger (not shown). The recirculated exhaust gas flows to an EGR valve 18, and then to the engine's intake manifold 22 where it is mixed with fresh intake air.

Control unit 20 may be processor-based, programmed to control various aspects of engine operation. In general, control unit 20 may be implemented with various controller devices known or to be developed. Further, control unit 20 may part of a more comprehensive engine control unit that controls various other engine and/or emissions devices.

System A

Figure 2:
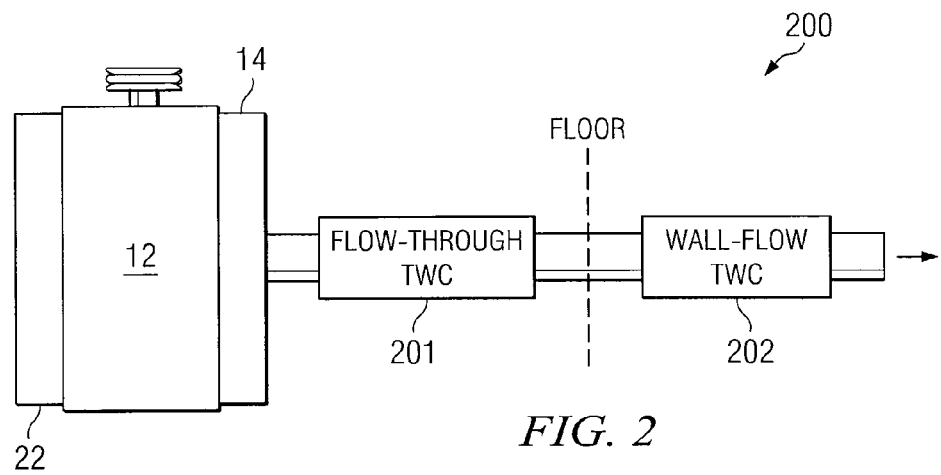
FIG. 2 illustrates an aftertreatment system designed for stoichiometric engine operation.

FIG. 2 illustrates "System A", identified as system 200, which is designed for spark-ignited engines operating under stoichiometric air-to-fuel ratio (AFR) engine operating conditions. System A consists of a close-coupled flow-through three-way catalyst (TWC) 201, and an under-floor wall-flow TWC 202.

TWC's are known in the art of emissions control, and are used to reduce HC, CO and NOx from an engine operated under stoichiometric AFR conditions. This type of engine typically has high exhaust temperatures.

Flow-through TWC 201 is closely coupled with the exhaust manifold of the engine. Typically, this means that it is located in the engine compartment and receives exhaust directly from the exhaust manifold. The close-coupled TWC 201 minimizes cold-start emissions.

Figure 3:
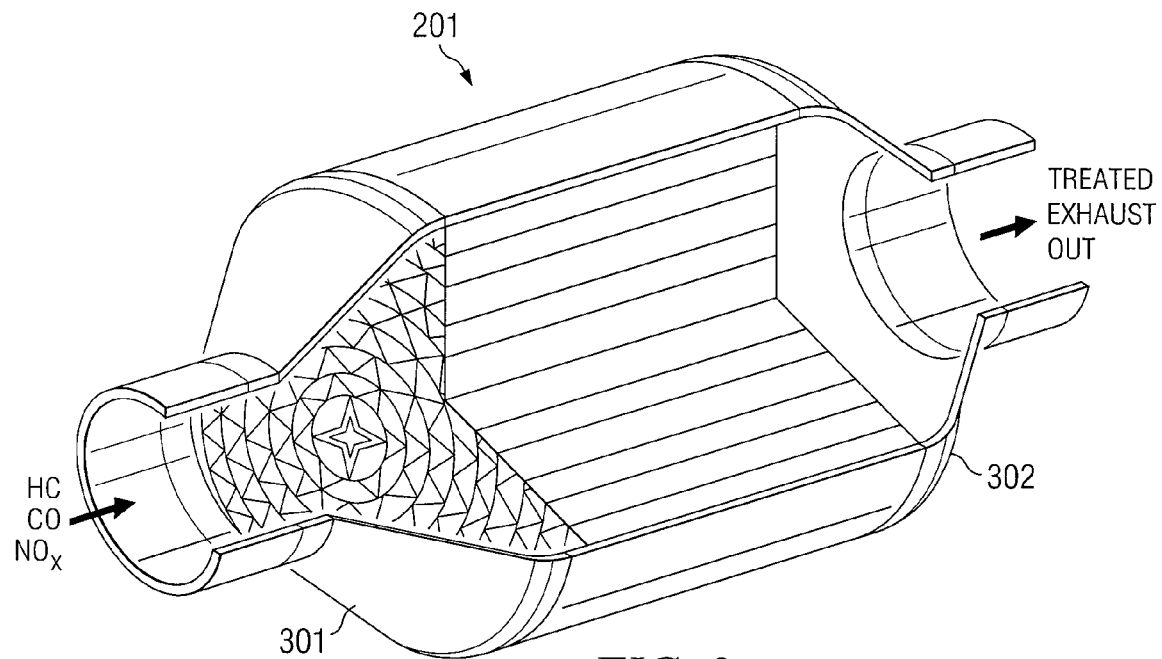
FIG. 3 illustrates a flow-through three way catalyst treatment device.

FIG. 3 illustrates flow-through TWC 201 in further detail. Flow-through TWC 201 comprises a number of longitudinal walls between an entry face 301 and exit face 302. These walls define longitudinal channels, such that the end faces of TWC 201 form a honeycomb pattern. Exhaust gas enters TWC 201 and is treated by catalytic formulation on channel walls within the device 201. The exhaust gas exiting device 201 has reduced HC, CO, and NOx.

Wall-flow TWC 202 is under the vehicle floor. As explained below, wall-flow TWC 202 has a TWC catalyst formulation coated on a wall-flow substrate.

Figure 4:
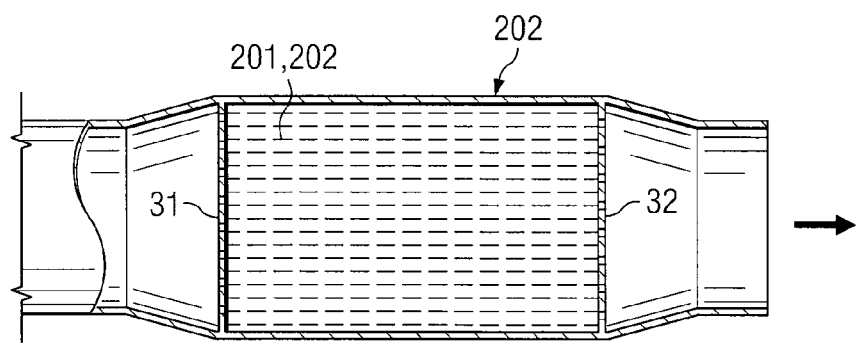
FIG. 4 is a side view of a wall-flow aftertreatment device.
Figure 5:
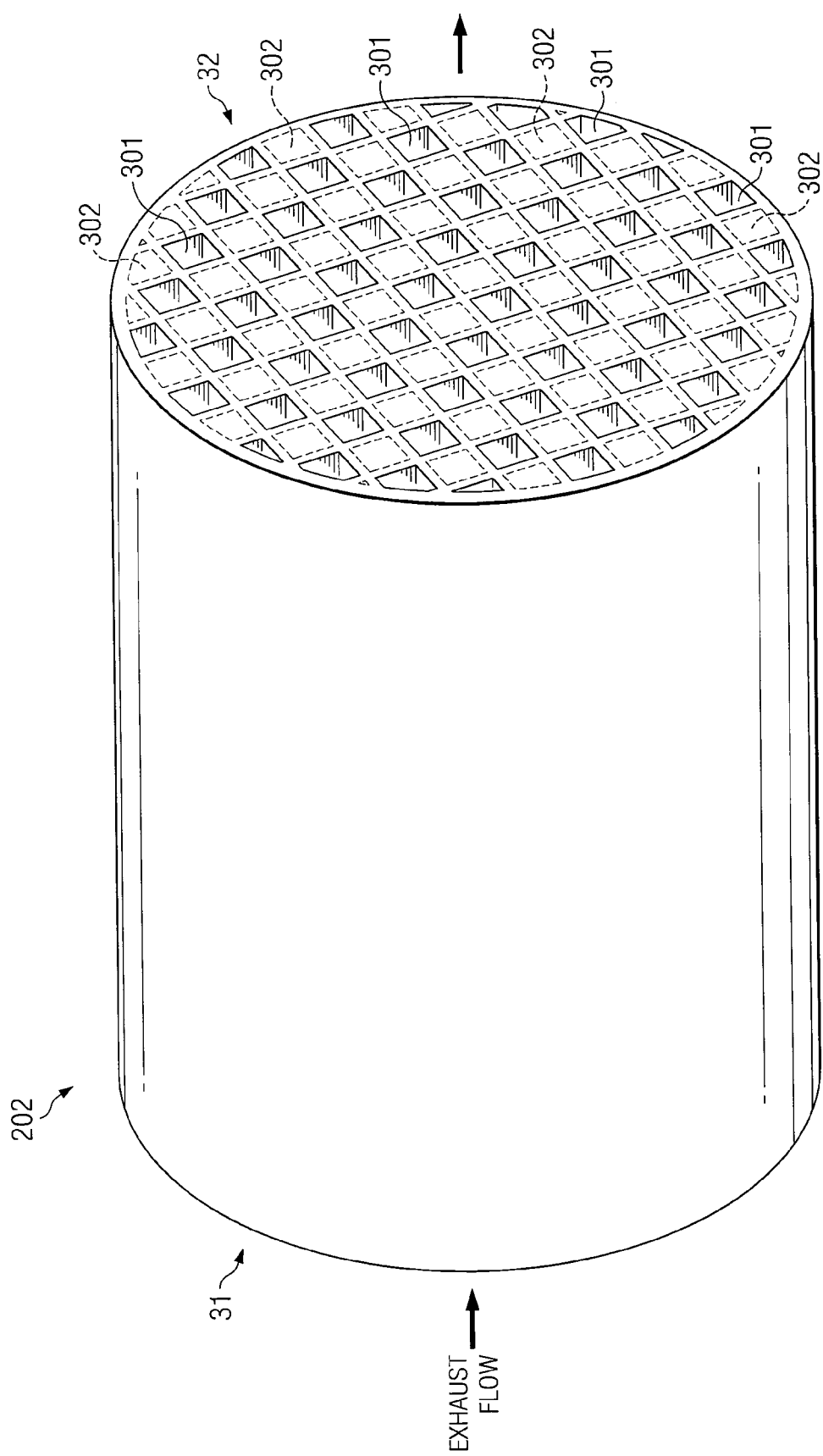
FIG. 5 is an end perspective view of a wall-flow aftertreatment device.
Figure 6:
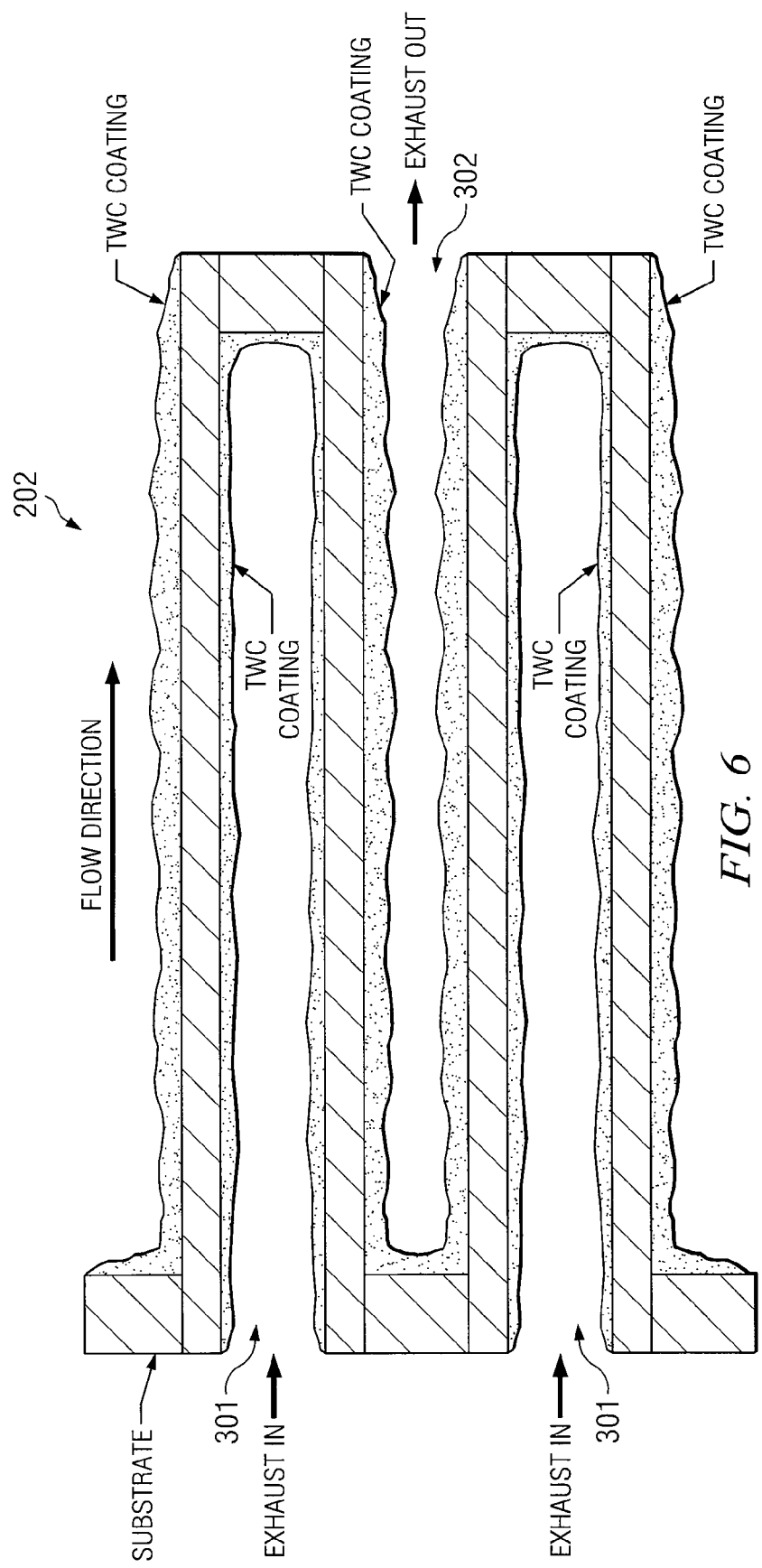
FIG. 6 is a partial cross sectional view of a wall-flow aftertreatment device.

FIGS. 4-6 illustrate wall-flow TWC 202 in further detail. FIG. 4 is a side view; FIG. 5 is an end perspective view, and FIG. 6 is a partial cross-sectional view.

Similar to a flow-through device, wall-flow TWC 202 comprises a number of longitudinal walls between an entry face 31 and exit face 32. These walls define channels 301 and 302, such that the end faces of TWC 202 form a honeycomb pattern.

However, unlike a flow-through device, inlet channels 301 are open at the entry face and closed (plugged) at the exit face; outlet channels 302 are closed (plugged) at the entry face and open at the exit face. Exhaust enters the open ends of the inlet channels at entry face 31, and exits the open ends of the outlet channels at exit face 32.

Typically, the number of inlet channels and the number of outlet channels are substantially equal. Their respective ends are plugged in an alternating pattern, such that the entry and exit faces form a checkerboard pattern.

By "wall flow" is meant that the exhaust gas flows through the inlet channels 301 to their dead ends. PM particles are filtered by the porous walls of the inlet channels 301, and deposit themselves in these channels 301. After the exhaust passes through the walls of the inlet channels 301, it exits the catalyst via the outlet channels 302.

The porous material comprising the longitudinal channels 301 and 302 is referred to herein as the "substrate" material. The material that plugs the ends of the channels is typically made from, and coated with, the same substrate material. The substrate material may be any material suitable for internal combustion engine filtering applications, such as cordierite, silicon carbine, aluminum titanate, and metal fiber. This material is referred to herein as "particulate matter filter material".

Referring particularly to FIG. 6, the catalytic function of wall-flow TWC 202 is achieved by coating the substrate with a TWC catalyst formulation. Because of its wall-flow filtering functionality, TWC 202 is operable to reduce PM, as well as the gases treated by conventional TWC devices.

Referring again to FIG. 2, installing the wall-flow TWC 202 further downstream (under the floor) increases its survivability by lessening its exposure to high temperature exhaust. The wall-flow TWC 202 can reduce HC, CO, NOx when light-off temperature is reached, and can effectively reduce PM emissions under all operating conditions. PM accumulated in the wall-flow TWC is passively regenerated under normal engine operating conditions, therefore, no active regeneration is required for the TWC 202.

Systems B1 and B2

Figure 7:
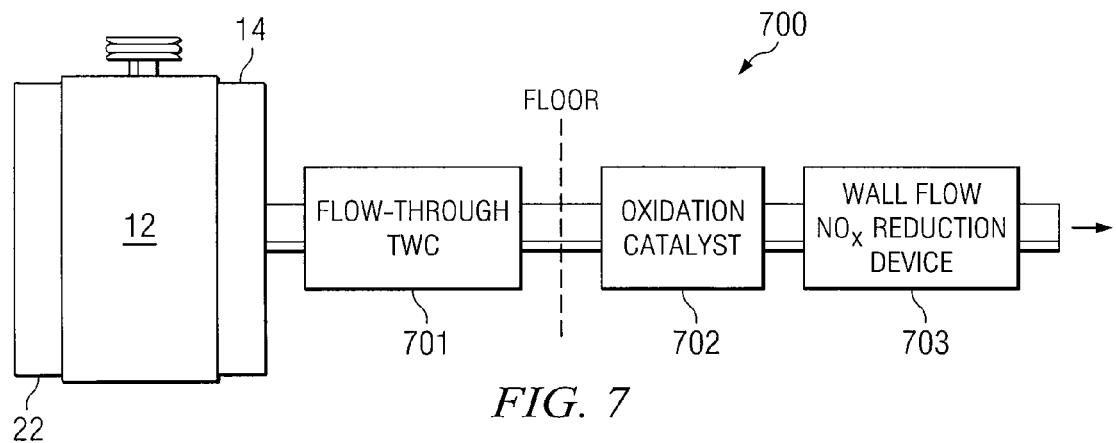
FIG. 7 illustrates an aftertreatment system designed for lean engine operation at higher temperatures.
Figure 8:
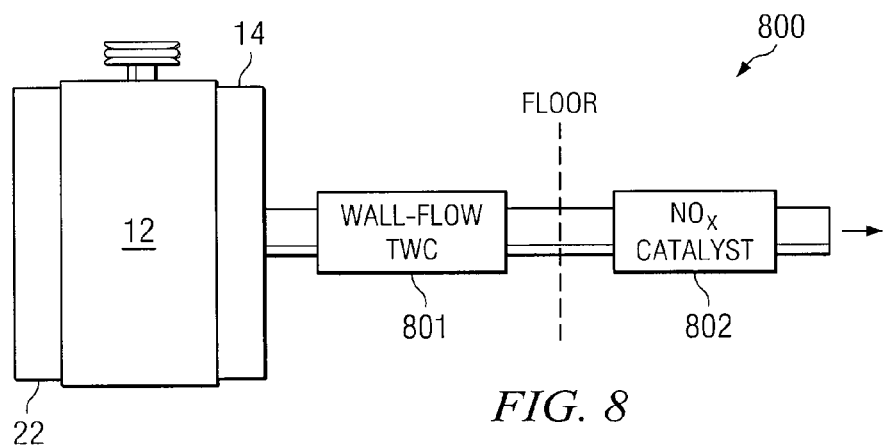
FIG. 8 illustrates an aftertreatment system designed for lean engine operation at lower temperatures.

FIGS. 7 and 8 illustrate "System B1" and "System B2", respectively. These systems are designed for spark-ignited engines operating under lean AFR conditions. For lean burn internal combustion, exhaust emissions of nitrogen oxides (NOx) become a greater concern, as compared to emissions resulting from stiochiometric combustion. To reduce NOx, a conventional approach is the use of NOx reduction devices, such as lean NOx traps (LNTs), lean NOx catalysts (LNCs), and selective catalytic reduction (SCR) catalysts.

Referring to FIG. 7, System B1 is identified as system 700. It has a close-coupled flow-through TWC 701, an under-floor oxidation catalyst 702, and an under-floor NOx reduction device 703.

TWC 701 has a flow-through structure, and is similar to flow-through TWC 201 of system 200. Also like TWC 201, TWC 701 is closely coupled to the exhaust manifold.

Oxidation catalyst 702 and wall-flow NOx reduction device 703 are under-floor devices, located on the exhaust tailpipe. Oxidation catalyst 702 is placed upstream of NOx reduction device 703 (relative to the exhaust flow). Oxidation catalyst 702 converts exhaust nitric oxide (NO) to $NO_2$ using excess exhaust oxygen. Oxidation catalyst 702 increases the NOx conversion efficiency of NOx reduction device 703.

NOx reduction device 703 has a wall-flow structure, which provides PM filtering functionality. Its channels are coated with a catalytic formulation, which can be a Selective Catalytic Reduction catalyst (SCR), a NOx Absorber Catalyst (NAC), or a Lean NOx Catalyst (LNT).

As an alternative to using two separate devices, the functions of oxidation catalyst 702 and NOx reduction device 703 may be combined into a single integrated device. For example, the channels of NOx reduction device 703 could be coated with a dual-function catalyst formulation, such as oxidation and NOx catalyst formulations. Examples of catalytic coatings capable of enhancing PM oxidation reactions are coatings containing one or more active elements such as platinum, palladium, rhodium, cerium, zirconium, cobalt, and iron. If an NAC formulation is used, the precious metal based NAC may be used as a PM oxidation catalyst.

When typical exhaust temperatures are relatively high (above 650 degrees C.), System B1 is preferred to protect the wall-flow NOx catalyst 703. In this case, an oxidation catalyst formulation is used to oxidize accumulated soot, especially when a urea-SCR or LNT is used as the NOx catalyst.

Referring to FIG. 8, System B2 is identified as system 800. System 800 has a close-coupled wall-flow TWC 801 and an under-floor flow-through $NO_x$ reduction device 802.

In function, wall-flow TWC is similar to wall-floor TWC 202. The wall-flow structure reduces PM emissions under all engine operating conditions. PM accumulated in the wall-flow structure is passively regenerated under normal engine operating conditions, therefore, no active regeneration is required.

NOx reduction device 802 is similar to NOx reduction device 703, and reduces NOx under lean-burn operating conditions.

When typical exhaust temperatures are relatively low (below 650 degrees C.), System B2 is preferred. This configuration allows PM to be reduced by the close-coupled wall-flow TWC 801. The downstream NOx reduction device 802 is protected from PM and lubricant-induced contamination.

What is claimed is:

1. An exhaust emissions aftertreatment system for use with a lean-burn spark-ignited engine-equipped vehicle having at least an engine with an exhaust manifold, an engine compartment, a floor, and a tailpipe, the engine having exhaust temperatures less than 650 degrees Centigrade, comprising:

a wall-flow three way catalyst aftertreatment device, located in the engine compartment and closely-coupled with the exhaust manifold, the wall-flow three way catalyst aftertreatment device including a substrate having an entry face and an exit face and a plurality of longitudinal and parallel walls between the entry face and the exit face, the walls defining inlet channels and outlet channels, the substrate being made from a particulate matter filter material; the inlet channels being plugged at the exit face and the outlet channels being plugged at the entry face; wherein the channels are coated with a three way catalyst formulation;

wherein the wall-flow three way catalyst is operational to passively regenerate during normal engine operating conditions of the lean burn spark-ignited engine;

wherein the wall-flow three way catalyst is further operational to reduce hydrocarbons, carbon monoxide and NOx from exhaust produced by spark-ignited lean burn engine operation when light-off temperature of the catalyst is reached and exhaust temperatures are below 650 degrees Centigrade; and a flow-through NOx reduction device, located under the floor of the vehicle, the flow-through NOx reduction device including an entry face and an exit face and a plurality of longitudinal and parallel walls between the entry face and the exit face, the walls defining inlet channels and outlet channels, the inlet channels being open at the exit face and the outlet channels being open at the entry face and wherein the channels are coated with an NOx reduction catalyst formulation.

2. The device of claim 1, wherein the NOx reduction catalyst is achieved with a lean NOx catalyst formulation.

3. The device of claim 1, wherein the NOx reduction catalyst is achieved with a NOx absorber catalyst formulation.

4. The device of claim 1, wherein the NOx reduction catalyst is achieved with a selective catalytic reduction formulation.

5. An exhaust gas aftertreatment method for simultaneously reducing the particulate matter (PM), hydrocarbon (HC), carbon monoxide (CO), and nitrogen oxide (NOx) emissions, for use with a lean-burn spark-ignited engine-equipped vehicle having at least an engine with an exhaust manifold, an engine compartment, a floor, and a tailpipe, comprising:

operating the spark-ignited engine at a lean air-fuel ratio and such that the exhaust gas temperature is less than 650 degrees Centigrade;

directing the exhaust gas to a wall-flow three way catalyst aftertreatment device, located in the engine compartment and closely-coupled with the exhaust manifold, the wall-flow three way catalyst aftertreatment device including a substrate having an entry face and an exit face and a plurality of longitudinal and parallel walls between the entry face and the exit face, the walls defining inlet channels and outlet channels, the substrate being made from a particulate matter filter material; the inlet channels being plugged at the exit face and the outlet channels being plugged at the entry face; wherein the channels are coated with a three way catalyst formulation;

wherein the wall-flow three way catalyst is operational to passively regenerate during normal engine operating conditions of the lean burn spark-ignited engine;

wherein the wall-flow three way catalyst is further operational to reduce HC, CO and NOx from exhaust produced by spark-ignited lean engine operation when light-off temperature of the catalyst is reached;

directing the exhaust gas to a flow-through NOx reduction device located under the floor of the vehicle, the flow-through NOx reduction device including an entry face and an exit face and a plurality of longitudinal and parallel walls between the entry face and the exit face, the walls defining inlet channels and outlet channels, the inlet channels being open at the exit face and the outlet channels being open at the entry face and wherein the channels are coated with an NOx reduction catalyst formulation; and wherein the wall-flow three way catalyst is further operational to reduce PM from exhaust produced by lean engine operation during all engine operating conditions, such that the NOx reduction device is protected from PM.

6. The method of claim 5, wherein the NOx reduction catalyst is achieved with a lean NOx catalyst formulation.

7. The method of claim 5, wherein the NOx reduction catalyst is achieved with a NOx absorber catalyst formulation.

8. The method of claim 5, wherein the NOx reduction catalyst is achieved with a selective catalytic reduction formulation.

* * * * *